(No Model.) 2 Sheets—Sheet 1.

M. W. LYDON.
MEASURING OR REGISTERING VALVE OR FAUCET.

No. 543,942. Patented Aug. 6, 1895.

(No Model.) 2 Sheets—Sheet 2.

M. W. LYDON.
MEASURING OR REGISTERING VALVE OR FAUCET.

No. 543,942. Patented Aug. 6, 1895.

UNITED STATES PATENT OFFICE.

MARTIN W. LYDON, OF WALLINGFORD, CONNECTICUT.

MEASURING OR REGISTERING VALVE OR FAUCET.

SPECIFICATION forming part of Letters Patent No. 543,942, dated August 6, 1895.

Application filed October 25, 1894. Serial No. 526,907. (No model.)

*To all whom it may concern:*

Be it known that I, MARTIN W. LYDON, of Wallingford, in the county of New Haven and State of Connecticut, have invented certain new and useful Improvements in Measuring or Registering Valves or Faucets, of which the following is a specification.

This invention has relation to means for measuring and recording the amount of liquid drawn from any sort of holder or receptacle; and it is the object of the invention to combine with the structure of a valve, faucet, or other appliance used to control the flow of a liquid or loose material in bulk through a pipe, passage-way, outlet, or inlet in any form of containing-vessel a device which shall not only measure the quantity of the substance drawn therethrough, but also automatically register such measurements, so that it can be definitely determined at any time as to the amount of the substance that has been drawn off, and also, as a consequence, the amount or quantity that may yet remain in the receptacle.

To these ends the invention consists of the combination, with a valve, faucet, or similar bend, of a measuring appliance movable with the valve in such manner that the operation or use of the latter shall necessitate the operation and use of the former in a way that will record or register the measurements, all as I will now proceed to describe in detail, and particularly point out in the appended claims.

Reference is to be had to the annexed drawings, and to the letters marked thereon, forming a part of this specification, the same letters designating the same parts or features, as the case may be, wherever they occur.

Figure 1:
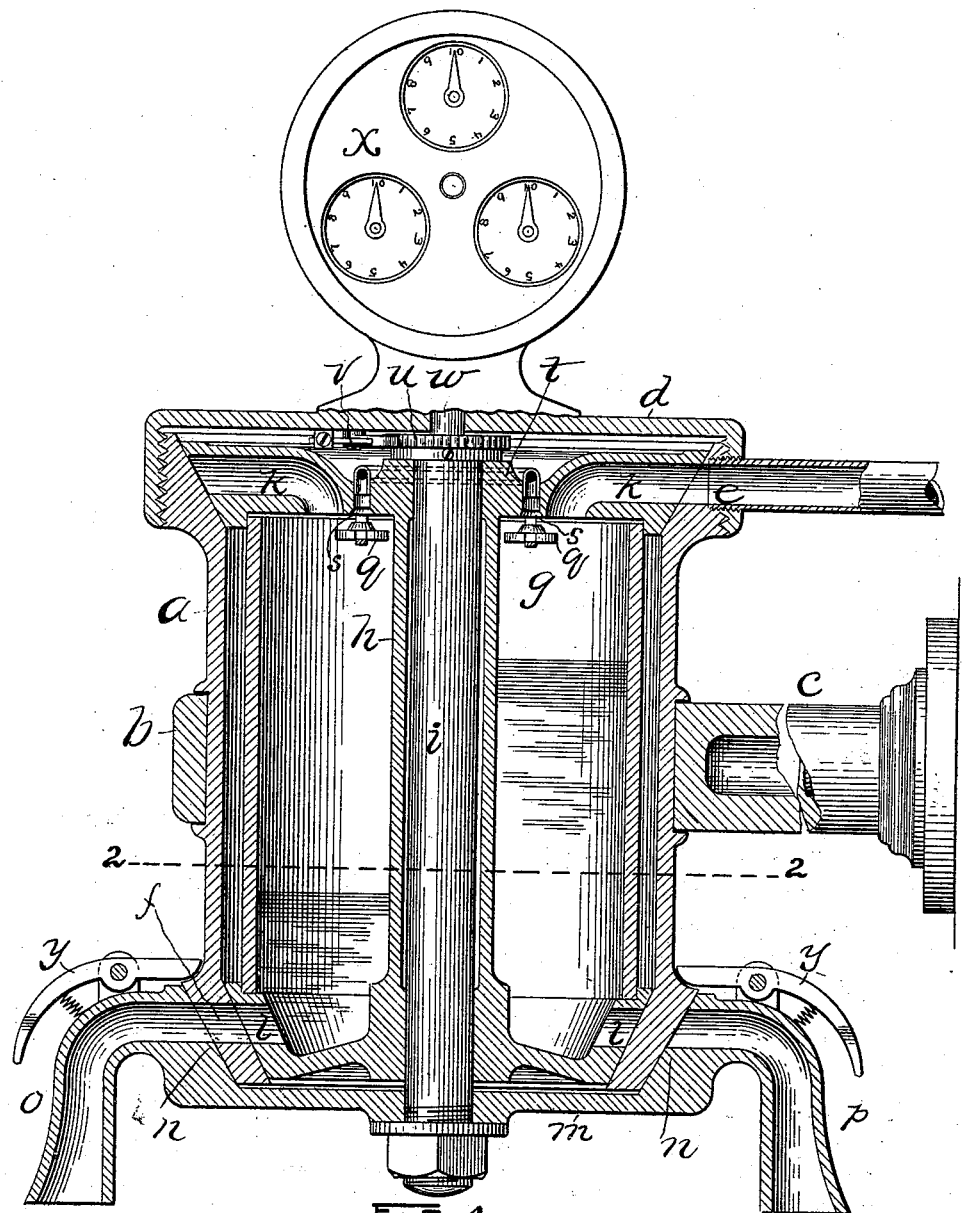
Figure 3:
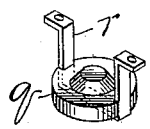
Figure 2:
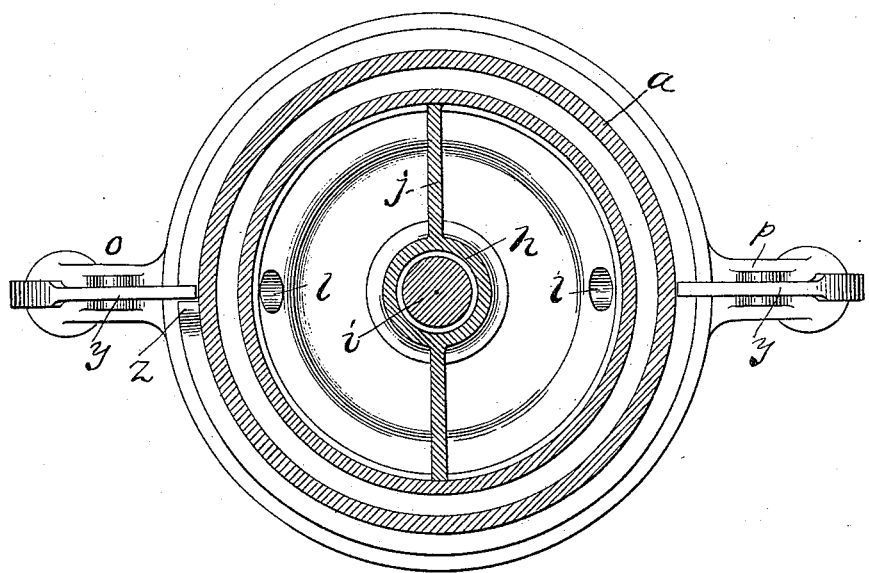

Of the drawings, Figure 1 is a vertical sectional side elevation, parts being shown in elevation, of a form of measuring and recording valve or faucet embodying my invention. Fig. 2 is a horizontal sectional view of the same, taken on the line 2 2 of Fig. 1. Fig. 3 is a perspective detail view of one of the subsidiary valves and its support which enter into the form of the device which I have chosen to show in order to explain my invention.

In the drawings, $a$ designates a stationary cylinder or case, which may be supported in any suitable way, being, in the present instance, held by the encircling band $b$ connected with the arm $c$. The case may be covered by the cap $d$, screwed thereon, and is provided with the inlet-port $e$ and outlet-port $f$.

$g$ designates the valve measuring-vessel, having beveled lower and upper ends, which beveled ends rest upon corresponding beveled seats formed on the interior of the casing, so as to form substantially water-tight connections therewith. A tube or sleeve $h$ extends through the center of the said vessel and forms a part thereof, and extending through the said tube or sleeve and connected therewith in a suitable way is a rod or bolt $i$. A web $j$ extends from the tube or sleeve in opposite directions to the sides of the vessel, dividing it into two compartments, each of which is provided with an inlet-port $k$ and an outlet-port $l$.

$m$ designates a base or plate connected with the rod $i$ and provided with flanged parts $n$ extending up outside of the beveled lower end of the measuring-vessel and provided with spouted outlet-ports $o$ $p$, which register with the ports $l$ $l$ in the lower end of the vessel $g$.

$q$ $q$ designate float-valves guided and supported by yokes $r$, connected with the top of the measuring-vessel—one for each compartment—which float-valves are adapted to co-operate with ports $s$ communicating through the medium of a connecting-passage $t$. (See dotted lines in Fig. 1.)

The bolt or rod $i$ is provided on its upper end with a ratchet-wheel $u$, with which a spring-pressed holding-pawl $v$ co-operates to hold the said bolt and parts connected therewith from turning backward.

Connected with the upper end of the bolt $i$ is a spindle $w$ by which a register or indicator $x$ may be operated to record the movements of the said spindle and its connections. As any of many well-known forms of registers or indicators may be employed it need not be particularly described.

In the use of the invention a pipe communicating with the inlet-port $e$ and the vessel $g$ will be provided, and each compartment of the latter will be constructed so as that when it is filled it will hold a particular quantity—say, for the purposes of this description, a pint. When the parts are in the position in which they are represented in Fig. 1, the liquid, flowing in through the ports $e$ and $k$, will fill the compartment with which they communicate, the air therein escaping through the passage $t$. When the liquid reaches the valve $q$ it will raise it, so as to close the port $t$, and the liquid will stop flowing into the vessel. Meanwhile the liquid will be drawn off through the spouted port $o$, air coming in to fill the space created by the displaced liquid through the port $t$. When it is desired to draw off another measure of liquid the operator will take hold of the spout $o$, depressing at the same time the outer arm of the spring-pressed lever $y$, releasing the inner end from the stop-lug $z$ and swinging the spout, plate $m$, bolt $i$, and all connected parts around to the extent of a half-turn until the inner end of the opposite lever $y$ will be brought into engagement with the stop-lug $z$. When in this position, the spouted port $p$ will be in register with the ports $f$ and $l$ and the empty compartment will be in place to be filled through the port $e$, while the filled compartment will be emptied through the spout-port $p$. In making the half-turn of the vessel $g$ and connected parts the spindle $w$ will be operated, so that the registering devices will be actuated to the extent of a unit. In this way the contents of a vessel may be accurately measured as they are drawn off and a tally kept exactly indicating the amount drawn off, and, consequently, the amount remaining in the vessel.

Having thus explained the nature of the invention and described a way of constructing and using the same, though without attempting to set forth all of the forms in which it may be made or all of the modes of its use, it is declared that what is claimed is—

1. A measuring faucet having a cylindrical casing provided with a single inlet port and a single exhaust port, a revoluble valve having a plurality of compartments each provided with an inlet aperture and an exhaust aperture, a spindle loosely mounted in said casing and having the valve rigidly mounted thereon, and a plate rigidly secured to said spindle and having a series of spouts, one for each exhaust aperture, substantially as set forth.

2. A measuring faucet, having an inlet port and an outlet port, and provided with a revoluble valve having a plurality of compartments, each compartment having an inlet port $k$ and an outlet port $l$, and a series of spouts one for each compartment, and adapted to be revolved, whereby a spout and its corresponding port $l$ will intermittingly register with the outlet port of the faucet, substantially as set forth.

3. A measuring and registering faucet having a stationary casing provided with a supply port and an exhaust port; and also provided with a projection on one side, a valve mounted in said casing and having a plurality of compartments each having an inlet aperture and a discharge aperture, and a plate having a series of spouts rigidly connected with said valve and locks on said plate to engage said projection, substantially as set forth.

In testimony whereof I have signed my name to this specification, in the presence of two subscribing witnesses, this 3d day of October, A. D. 1894.

MARTIN W. LYDON.

Witnesses:
W. A. TRASK,
WM. H. NEWTON.